United States Patent [19]

Reinauer

[11] Patent Number: 4,844,671
[45] Date of Patent: Jul. 4, 1989

[54] COUPLING DEVICE

[75] Inventor: Josef Reinauer, Sigmaringen, Fed. Rep. of Germany

[73] Assignee: Gottlieb Guhring KG, Herderstrasse, Fed. Rep. of Germany

[21] Appl. No.: 192,639

[22] Filed: May 11, 1988

[30] Foreign Application Priority Data

May 11, 1987 [DE] Fed. Rep. of Germany ....... 3715658
May 22, 1987 [DE] Fed. Rep. of Germany ....... 3717270

[51] Int. Cl.⁴ .......................... B23C 5/26; B23B 31/02
[52] U.S. Cl. ................................ 409/233; 408/839 R
[58] Field of Search ............... 409/232, 234, 233, 231;
408/239 R, 239 A, 238; 279/2 R, 108, 106, 1 B;
82/36 A, 36 B

[56] References Cited

U.S. PATENT DOCUMENTS

| 1,617,672 | 2/1927 | Delany | 279/108 |
| 3,593,614 | 7/1971 | Galbarini | 409/232 |
| 3,760,489 | 9/1973 | Griffith | 29/568 |
| 4,322,190 | 3/1982 | Anderson | 409/234 |
| 4,350,463 | 9/1982 | Friedline | 409/234 |
| 4,596,502 | 6/1986 | Catiani | 409/231 |
| 4,655,631 | 4/1987 | Mitchell | 409/232 |
| 4,715,753 | 12/1987 | Tack | 409/234 |
| 4,768,282 | 9/1988 | Rieck et al. | 408/239 R X |

FOREIGN PATENT DOCUMENTS

| 26751 | 4/1981 | European Pat. Off. | 409/233 |
| 250489 | 10/1987 | Fed. Rep. of Germany | 29/568 |
| 795756 | 1/1981 | U.S.S.R. | 409/233 |
| 948555 | 8/1982 | U.S.S.R. | 409/233 |

Primary Examiner—William Briggs
Attorney, Agent, or Firm—Oblon, Spivak, McClelland, Maier, & Neustadt

[57] ABSTRACT

Described is a coupling device between a workpiece support or a tool support, such as for example a tool system module, for example in the form of a basic tool holding fixture, and a handling device, such as for example a machine tool, especially a spindle. For rapidly producing and releasing the connection between these components while making high axial forces available, a clamping device with an operating rod is provided by which a key mechanism is controlled, with which clamping elements provided in the part to be coupled can be pressed essentially radially outward into a suitably shaped recess on the other part to be coupled. The clamping elements are formed from at least three clamplike claw-type clamps placed at a uniform angular distance to each other, placed essentially parallel to a centering extension of the basic tool holding fixture and able to be pivoted, while being braced in a centering mounting of the spindle with a claw section lying radially inside the centering extension in the coupled state, into a groovelike recess of the centering extension. This coupling device is distinguished by a high flexibility with regard to application possibilities for producing them economically.

29 Claims, 16 Drawing Sheets

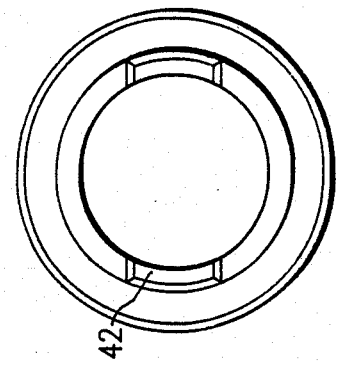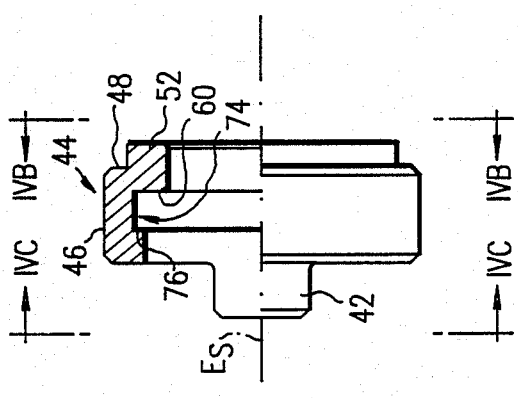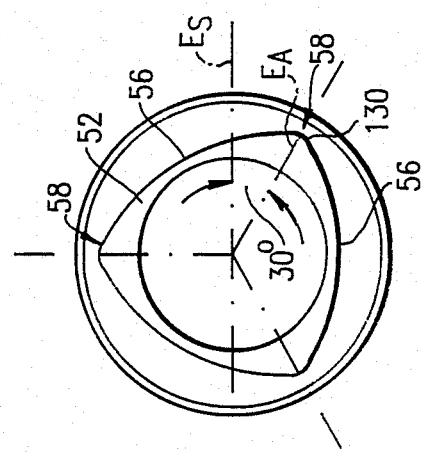

COUPLING DEVICE

BACKGROUND OF THE INVENTION

The invention relates to a coupling device between a workpiece support or a tool support, such as for example a tool system module, for example in the form of a basic tool holding fixture, and an appurtenant handling device, such as for example a machine tool, for example in the configuration of a drilling machine, a lathe, or a milling machine. The coupling device here is to be suitable for stationary and for mobile, such as for example turning workpiece supports or tool supports, such as for example tool system modules.

In the course of the recent technical development up to automated machining centers, the need arises for tool systems, constructed module-like, that must be changeable with the least possible time expended. A series of coupling devices between individual tool system modules have already been developed and suggested that are suitable for stationary and also for turning tools. It has also been attempted to transfer these modular couplings to interfaces between machine tools and tool system modules. But in doing so it has been shown that it is difficult to configure the coupling device in such a way that it equally meets the requirements for stability, position accuracy, lubricant supply of the tool and the capacity to automate the tool change.

Thus, just from the journal "Moderne Fertigung" (Modern Production), November 1986 issue, a coupling device is disclosed between a tool system module and a machine tool in which a mounting is provided on the machine tool side for an extension of the tool system module and a clamping device is provided for generating an engaging pressure between end faces of the parts to be coupled. The clamping device includes an operating rod by which a key mechanism is actuated so that clamping elements in one part to be coupled are pressed radially outward to engage suitably configured recesses on the other part. Thus, a cone connected to the operating rod of the clamping device presses two clamping bodies that are offset diametrically to each other radially outward into suitably shaped recesses of screws that are screwed radially from the exterior into the spindle mounting. The recesses in the screws are configured cone-shaped just like the areas of the clamping bodies that engage in it, and a certain axis offset between the cone of the screw recess and the cone of the clamping body is provided, so that during a radial outward pressing of the clamping bodies an axially-oriented engagement pressure force is generated between the parts to be coupled. The bracing occurs here by relatively large radial end faces, by which a relatively high rigidity of the system results. In any case, these end faces cannot be used for the entire transmission of compressive force, since catch pins must be provided perpendicular to these end faces which provide for an indexing of the tool system module relative to the machine tool or for carrying along the tool system module through the coupling part on the machine tool side such as, i.e., the spindle. To face the problem of attaching a relatively cool tool system module to an already prewarmed coupling part on the machine tool side unconstrained, it is advantageous if the tool system module exhibits a engagement extension and the coupling part on the machine tool side exhibits a mounting provided for this. But in the known case this advantage must be paid for with the drawback that the tool system module must be equipped with a relatively complex mechanism that incorporates the key mechanism, an operating rod and both clamping bodies.

To avoid this relatively great expense, it has already been suggested that this known coupling system be kinematically reversed, i.e., to place the clamping elements together with the operating rod and the key mechanism on the machine tool side. But this leads, in the known case, to the fact that now a centering pin must be attached to the coupling device on the part on the machine tool side. However, by doing this, on the tool system module side an inner area must be produced to precision, which leads to relatively high costs. Further, this system reversal means that when adding a tool system module that has lower temperature than, for example, the already prewarmed machine tool spindle, matching problems can appear, and it must be taken into consideration that for reasons of positioning accuracy, relatively narrow tolerances must be provided.

Further, it has been shown that the rigidity of the interface between tool and machine tool is limited by the fact that the bending moment of resistance of the coupling device in the area of the interface is defined only in the plane that contains the axes of the clamping bodies and the screws. With rotating loads this means that the coupling device is not effectively in a position to counteract the formation of tool vibrations.

Thus the object of the invention is to provide a coupling device of the type described, but which meets the requirements to an improved degree regarding position accuracy of the workpiece support or tool support, such as, e.g., of the tool system module, rigidity of the connection, capacity of the workpiece or tool change to be automated, and flexibility with regard to fields of application and economy. This object is achieved by providing clamping elements that are constructed of at least three claw-type clamps placed peripherally equidistant from one another and essentially parallel to an extension of the tool system module and which is pivoted with a claw section, which is in a coupled state radially inside the extension, into a groovelike recess of the extension.

According to the invention, by providing a clamplike bracing between the parts to be coupled, the flux of force between the coupling parts is improved, i.e., it is kept as even as possible over the periphery of the interface between the tool system module and the machine tool. By homogeneous distribution of force over the periphery, in combination with the configuration according to the invention of the claw-type clamps in the form of essentially axially aligned clamplike elements, the construction space needed in the radial direction for the claw-type clamps becomes very small, due to which the possibility arises that the end faces that are in junction with each other of the parts to be coupled can be constructed very large. Because, further, with the configuration according to the invention of the coupling device, no mobile part is necessary near the axis, there results a compatibility with most varied tool systems, for example also those in which a modular coupling with axial attachment screws is constructed. In doing so, it is still made certain that temperature-related difficulties during change of the tool system module are excluded right from the basic concept, since the optionally colder tool system module engages with an extension in a mounting. The relatively more expensive matching inner area here is formed in the area of the part on the machine tool side, thus reducing the costs of the tool system module. This results in the particular advantage that there are no more mobile parts in the tool system module, by which the production costs can be reduced considerably.

The advantages described above result for every kind of a coupling between a workpiece support or tool support and a handling device, which for example can be made up of a workpiece changing system.

The design of the coupling device according to the invention has advantages especially when it is used in the area of the interface between a machine tool spindle and a basic tool holding fixture. In this case, an extremely simple spindle structure results, since all parts can be configured dynamically balanced. An additional advantage here can be seen in the fact that spindles of machine tools commercially available can be retrofitted with low expense with the coupling system according to the invention, and the connecting rod already provided in the spindles can continue to be used and only a supplementary spindle flange that carries the claw-type clamps must be constructed. In doing so, the lifting path to release the coupling device is still considerably reduced relative to a standard coupling system with a steep angle taper. Since, on the tool system module side only an end face and a centering extension must be constructed, it is also possible to provide structurally identical, standardized gripper slots for an automatic tool change, by which additional economic advantages result and the advantages of cylinder fit with regard to the positioning accuracy is still retained.

The dynamically balanced configuration of the coupling device further offers, in an advantageous way, the possibility of transmitting the engagement pressure without transverse force and in this way of raising the positioning accuracy and ultimately also the stability of the tool. Under the action of the key mechanism, the clamplike claw-type clamps conform extremely uniformly to a flank in the groovelike recess of the centering extension, and by suitable configuration of the areas of the key mechanism that are in engagement, an introduction of the binding force that is as loss-free as possible can occur. Here, it is further an advantage that the small elastic deformation of the centering extension caused by the pressing outward of the claw-type clamps has the tendency to form the fit between spindle and tool system module more exactly, i.e., to improve it.

The generation of the axial engagement pressure without transverse force is additionally improved by providing a longitudinal bore in the operating rod for supplying lubricant therein. In this way a floating support of the operating rod is provided, by which the thrust cone, upon introduction of the force, undergoes an automatic centering radially within the claw-type clamps. The claw-type clamps themselves are braced, with their end facing away from the claw section, in a radially selected position in the mounting, so that a mechanism is provided that works unconstrained and with which the engagement pressure can be generated over the periphery extremely is provided uniformly.

When the thrust cone is placed radially inside the claw sections, there results an immediate introduction of the cone force onto the claw sections, and a power transmission ratio occurs by the key areas of the key mechanism. A further power transmission ratio step is generated according to the invention by the pivoting of the claw sections into the groovelike recess in the centering extension, so that very high axial clamping forces can be applied. The coupling device according to the invention is accordingly suitable for use at interfaces of nearly all types of machine tools.

Basically it is possible to secure the claw-type clamps at any point in the centering mounting of a spindle in such a way that, while retaining a predetermined radial position, they can be brought in and out of engagement with the groovelike recess of the centering extension. But especially advantageous is the further development according to which one of the supporting grooves provided for the claw-type clamps is constructed in a catch ring that is placed in the centering mounting.

The advantage achieved by using at least one engaging dog that engages in the front of the centering cylinder in a recess to introduce selectively the forces occurring during torque transmission and thus to keep the engagement end faces between the parts to be coupled undamaged, is also maintained even when the catch ring supports the at least one engaging dog. Further, there results the advantage, from a production engineering viewpoint, that the functional areas provided for the pivoting movement of the claw-type clamps and for the transmission of peripheral force are now formed on a single component and thus can be produced with greater precision with regard to the controlled vane position to one another.

From a production engineering viewpoint, suitably configuring the catch extension of the catch ring is advantageous, since in this way only one axial machining of the part on the machine tool side, for example of the machine tool spindle, must occur.

It has been shown that by the prism-like configuration of the catch extension on the catch ring, very high peripheral forces can be transmitted, and the working diameter of the catch extension can remain relatively limited. For the construction of the catch extension, basically any regular polygon cross section can serve as the basis. But it has been shown that good results can be achieved on the basis of a triangular prism with rounded edges and prime surfaces that are curved convex. In this way there results a non-slip connection in the form of a so-called K-profile, however, the level areas provided there between the edge curves are replaced by convex areas.

The service value of the coupling device according to the invention is also increased by supporting diametrically opposed engaging dogs by the catch ring, the plane of symmetry thereof enclosing an angle of 30° with one of three axial planes passing through the catch extension. With this configuration not only is it achieved that the peripheral forces occurring during torque transmission are symmetrically transmitted, but furthermore the condition is provided so that an indexing of the tool system module relative to the machine tool can occur in increments of 30°.

For additional stabilization of the claw-type clamps, the function of fixing the catch ring selectively in the centering mounting can be simultaneously transferred to the guide cylinder, by which the number of components can be reduced.

By providing an elastic ring for an annular slot in the guide cylinder, the condition for the floating support of the operating rod in the area of the key mechanism as mentioned above, by which it becomes possible to implement the automatic centering effect, but in doing so, at the same time the coupling operation is not made more difficult, since the elastic gasket provides for a sufficient advance centering of the coupling parts.

As initially explained above, the configuration of the coupling device according to the invention offers a purely dynamically balanced design that needs no components in the vicinity of the axis. In an advantageous way this offers the possibility of supplying the tool system module, by symmetrical supply channels, with coolant or lubricant for the tool. For this purpose, it is necessary only that the operating rod receives a longitudinal bore for lubricant. This lubricant is then conveyed further inside the thrust cone and is fed by a hollow pin to a coaxial recess in the tool system module.

As an alternative to this it is possible to provide in the thrust cone an axially centered bore, into which a hollow pin fastened in the tool system module can engage as a seal. In this way the lubricant supply can continue to occur without radial deflections, but it is additionally taken care of that the lifting movement during release of the coupling device remains limited to the axial linear dimension of the centering cylinder.

An especially advantageous configuration of the groovelike recess in the centering extension or centering cylinder is one in which the annular slot therein exhibits a V cross section, since this groove can be produced in the perforation process.

The design according to the invention of the coupling device offers the possibility of configuring the functional areas between claw-type clamps, mounting cylinder and centering cylinder so that engagement areas with as large a surface area as possible arise.

If a centering ring which is fastened radially adjustably on a spindle is provided, the concentricity can additionally be made adjustable, by which the positioning accuracy of the tool system module can be further raised.

By the configuration of the claw sections of a key flank slanting on the outside down to the tool system module, the design of the coupling device can be additionally simplified. The key flank slanting down to the tool system module has the effect that the centering cylinder, upon insertion into the machine tool recess, pushes the claw sections radially inward.

An additional advantage of the coupling device described above can again be seen in the fact that it is possible, with a single interface, to carry out diameter reductions, i.e., transitions from a relatively large spindle diameter to a relatively small diameter of the tool system module, without increasing the total axial length. For this purpose, it is necessary only to insert into the centering mounting a suitably shaped reducing ring and claw-type clamps which are correspondingly offset radially inward and which can then be brought into functional engagement with an optionally somewhat modified thrust cone.

It has been shown that especially good results can be achieved with six claw-type clamps.

In the suggestion for the coupling device described above, a homogeneous force distribution over the periphery and an exact positioning of the parts to be coupled to one another is dependent on the state of the functional areas of the parts to be coupled that can be brought into matching engagement with one another. The need thus arises to keep these functional areas used in the coupling device clean, even under rough conditions, i.e., in use with the greatest cutting power and even with unfavorable formation of a cutting, and to keep the device engineering expense necessary for this as small as possible. The functional areas of the parts of the coupling device that can be brought into engagement are, in the released state of the coupling, preferably cleansed continuously with compressed air so that dirt, grinding dust and the like cannot cling to the matching areas. Damages to the matching areas can thus effectively be ruled out so that the lifetime of the coupling device is additionally increased.

With the dynamically balanced design of the coupling device of this invention, there results a very simple supply of compressed air to the sluice system which cleanses effectively the end face engagement between the tool system module and the spindle. The compressed air sluices in the radial ring area segments assure that when the tool system module approaches the area of the matching areas, a constantly, increasingly accelerated compressed air flow is generated between the matching areas to be moved on each other, by which even the finest grinding dust is reliably removed from the matching area. In doing so, the grooves between the radial ring area segments additionally act as elutriation chambers, so that keeping these matching areas clean is additionally simplified.

According to the present invention, the function of selectively fixing the catch ring in the centering mounting is simultaneously conferred upon the guide cylinder, by which the number of components can be reduced. By the configuration according to the invention of the annulus that can be supped with compressed air, the available compressed air is fed with low losses to the important points that are to be kept clean or to be cleansed. This further development is advantageous especially if longitudinal grooves in the catch ring run out radially and merge into an annular gap which opens to a cylindrical matching area and rotates, since in this way the compressed air flowing through the branch channels can be kept, from the viewpoint of great mass throughout, so great that not only the end face but also the cylindrical matching innder area can be rinsed or cleansed.

According to another configuration of the guide cylinder according to this invention, the condition for the floating support of the operating rod in the area of the key mechanism is afforded, by which the automatic centering effect can be achieved, but in doing so simultaneously the coupling operation itself is not made more difficult, since the elastic gasket takes care of a sufficient advance centering of the coupling parts.

If a centering ring is provided with compressed air sluices, the concentricity can in addition be made adjustable, by which the positioning accuracy of the tool system module can be further raised. Construction of the compressed air sluices in the centering ring results in a very cost effective preparation of the sluice system, since the compressed air sluices can be accommodated in a separate component. This results in the additional advantage that by using the centering ring which, for its statically determined mounting in the spindle is in engagement with the spindle only at an end face and at a cylindrical matching area, an annulus on the back side of the centering ring necessarily arises by which the compressed air can be uniformly distributed to the individual sluices. An annular gap to clean the cylindrical matching area between spindle and tool system module can be provided simply in this way in that suitable matching of the diameter of the catch ring and the centering ring occurs.

Further advantageous configurations of the invention are the object of the remaining subclaims.

BRIEF DESCRIPTION OF THE DRAWINGS

Below, based on diagrammatic drawings, several embodiments of the invention will be explained in more detail. Shown are.

FIG. 4A a view shown partially in axial section of a catch ring;

FIG. 4B a view of the catch ring according to "IVB" in FIG. 4A;

FIG. 4C a view of the catch ring according to FIG. 4A according to "IVC" in FIG. 4A;

DESCRIPTION OF THE PREFERRED EMBODIMENTS

Figure 1:
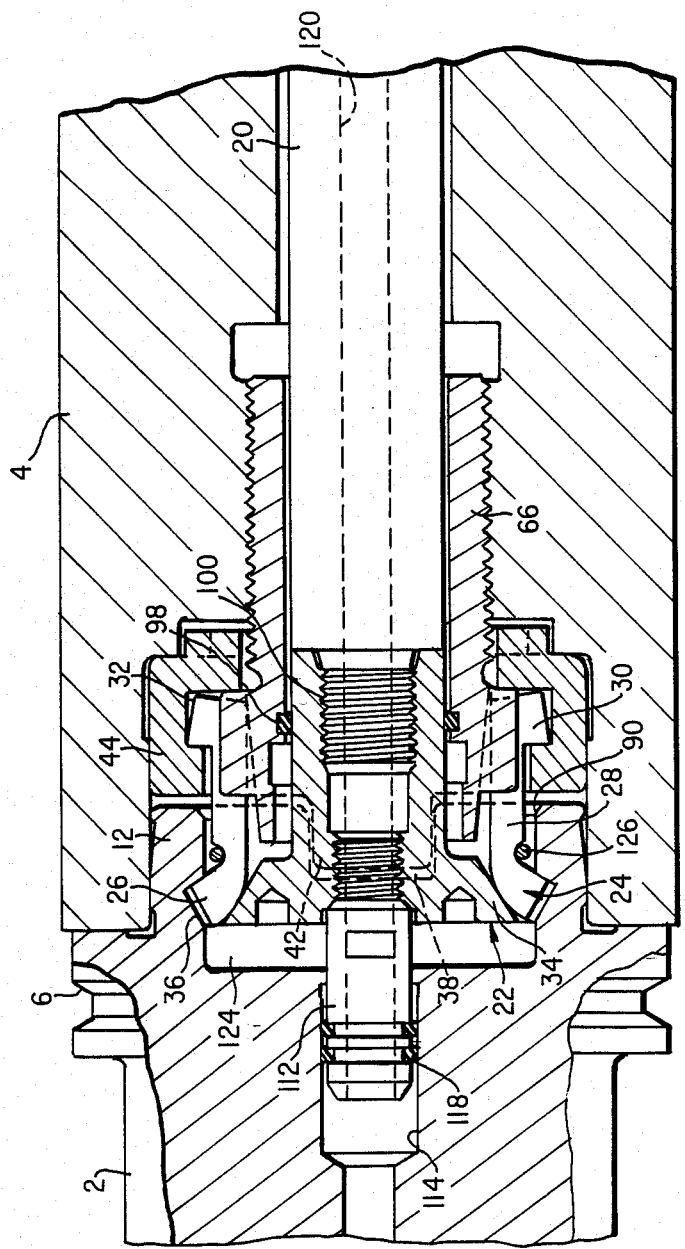
FIG. 1 an axial section of a first embodiment of the coupling device.

In FIG. 1, reference symbol 2 designates a tool system module, such as for example a basic tool holding fixture and reference symbol 4 designates a machine tool spindle, such as for example the spindle of a grinding machine. The coupling device to be described in more detail below relates to the interface between these two components, of which the one represents any tool system module and the other represents a part of a machine tool that supports this tool system module.

Figure 2B:
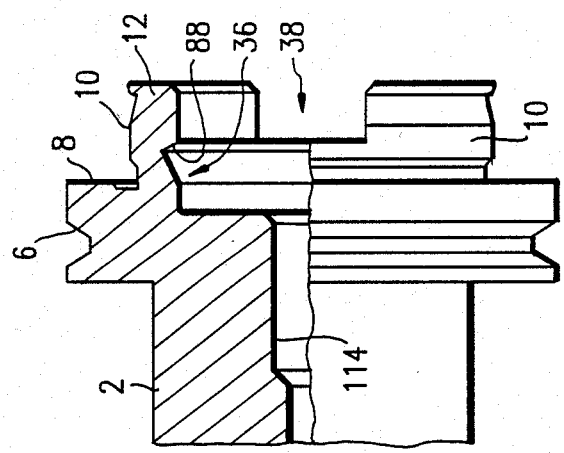
FIG. 2B a side view shown partially in section of the basic tool holding fixture.
Figure 2A:
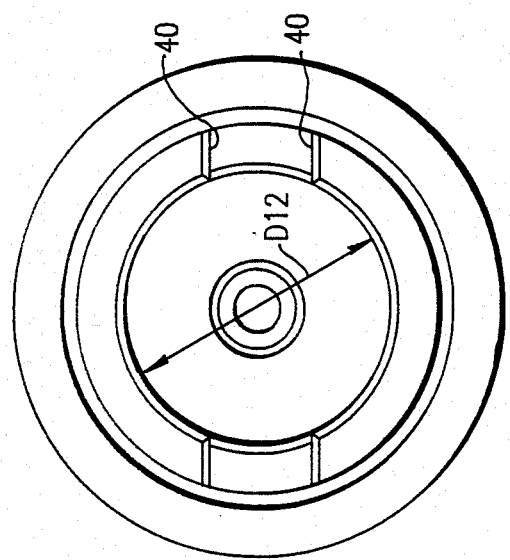
FIG. 2A a front view of the tool system module in the configuration of a basic tool holding fixture.
Figure 3B:
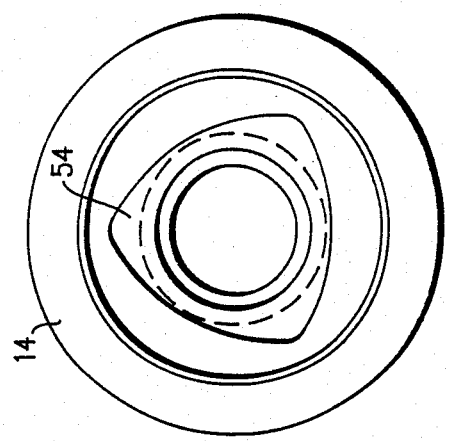
FIG. 3B a front view of the machine tool spindle according to "IIIB" in FIG. 3A.
Figure 3A:
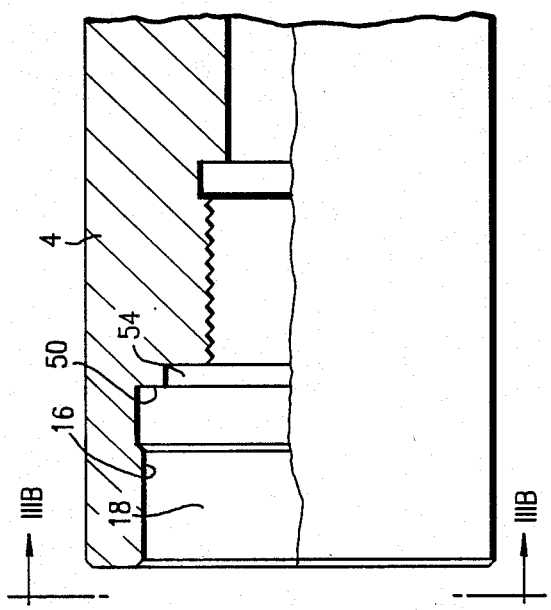
FIG. 3A a sectional representation of the end section of the machine tool spindle facing the basic tool holding fixture.

To make possible an automatic change of the tool system module, the tool system module exhibits a gripper slot 6, which can be constructed in the standard way. The coupling device to be described in more detail below must be in a position to press the components in a predetermined radial and axial positioning firmly against each other. A further essential criterion to take into consideration is an ability of the coupling to be released easily while realizing the smallest possible lifting paths. For this purpose the coupling device has the following structure:

Basic tool holding fixture 2, which is shown in detail in FIG. 2A and 2B, exhibits a radial ring area 8 and a centering area 10, which is formed on the outside of a centering cylinder 12. For areas 8 and 10, corresponding counterpart areas 14 and 16, which can be seen in detail in FIG. 3, exist on the spindle 4 side. Area 14 in turn is formed as a radial ring area and area 16 is an element of a centering mounting for centering cylinder 12. In this way a pairing of the end faces arises that can be formed uninterrupted and undamaged.

The release and engaging of the coupling occurs as in numerous standard coupling devices by an operating rod 20 supported centrally in spindle 4, and operating rod 20 can be pressed to the left against the force of a spring assembly not shown in more detail in the representation according to FIG. 1. By operating rod 20 a key mechanism 22 is actuated, by which clamping elements 24 are controlled. As clamping elements 24, six claw-type clamps placed at equal angular distances of 60° to one another are provided which span, like clamps, the point of impact between parts 2 and 4 to be coupled. The claw-type clamps exhibit a claw section 26 that lies radially inside centering cylinder 12, a bar section 28 that follows this and a hook-shaped end section 30 that engages in a groove set axially relative to the spindle. By acting on a thrust cone 34, clamping elements 24, by bracing their hook-shaped end sections 30 in groove 32 with their claw sections 26, can be pivoted into a groovelike recess 36 in centering cylinder 12 and thus generate an axially-oriented engagement pressure between basic tool holding fixture 2 and spindle 4.

To transmit torque between spindle 4 and tool system module 2, a claw toothing is provided, which will be described in more detail later. As can be seen from FIG. 2A and 2B, in centering cylinder 12 a catch groove 38 that runs diametrically is incorporated, i.e., cut in, so that two matching end faces 40 arise. Suitably shaped engaging dogs 42 engage in this groovelike recess and, in the embodiment represented, these engaging dogs are formed on a catch ring 44.

The catch ring is represented in detail in FIG. 4. It exhibits a cylindrical matching area surface 46 for the matching engagement with cylinder area 16 of spindle 4, a radial area 48 for lying flat against a shoulder surface 50 of centering mounting 18 of spindle 4 and a catch extension 52 for engagement in an axial indentation 54, in centering mounting 18, that is connected to shoulder 50. Catch extension 52 has essentially a polygon profile, and it has been shown to be advantageous if the catch extension leans against a prism shape with three edges. The catch extension, just like indentation 54, exhibits three lateral areas 56 that are curved convex outward and that merge into each other by curved sections 58. In this way, catch extension 52 receives a shape that is similar to a K profile that is used in mechanical engineering as a non-slip shaft-hub connection.

For axial fixation of catch ring 44, catch ring 44 exhibits a radial inner shoulder 60, against which holding sections 62 of a clamping body 64 (see FIG. 6) can be pressed. For this purpose, the clamping body exhibits a thread section 66, with which it can be screwed into spindle 4. Holding section 62 is formed essentially sleeve-shaped to leave enough room on the inside for operating rod 20. In the end area facing away from thread section 66, clamping body 64 exhibits an inner hexagonal recess 68, to facilitate the screwing into spindle 4.

Figure 6A:
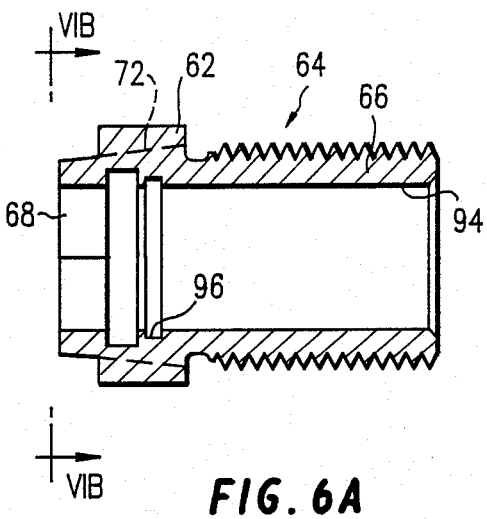
FIG. 6A a longitudinal section of a guide cylinder.
Figure 6B:
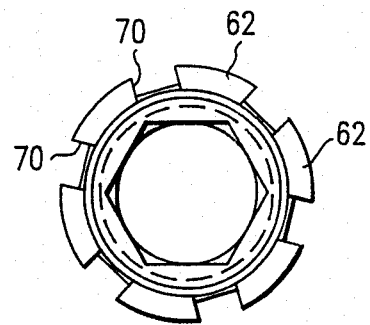
FIG. 6B a view of the guide cylinder according to "VIB" in FIG. 6A.
Figure 7:
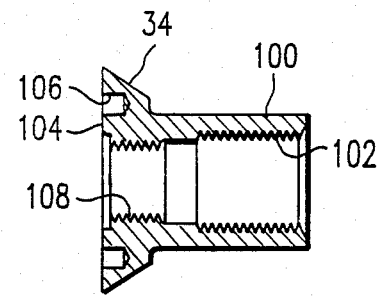
FIG. 7 a longitudinal section of the thrust cone according to FIG. 1.

From the representations according to FIG. 1 and 6, it can be seen that claw-type clamps 24 are guided in clamping body 64. For this purpose, between holding sections 62 a number of guide recesses 70 corresponding to the number of claw-type clamps is provided and claw-type clamps 24 are guided with clearance fit, mobile in a radial direction, into guide recesses 70. For this purpose the groove base of guide recesses 70 slants down toward tool system module 2 so that the claw-type clamps can carry out a limited pivoting movement in the radial direction inside guide recesses 70. Groove base 72 is indicated by the dashed line in FIG. 6A.

To fix claw-type clamps 24 in the axial direction on spindle 4, in catch ring 44 a supporting groove 74 is provided whose front groove wall 76—as can be seen from FIG. 1—in the coupled state of parts 2 and 4, is in flat engagement with hook-shaped end section 30 of respective claw-type clamp 24. To make possible the limited pivoting movement indicated above of claw-type clamps 24, supporting groove 74 is formed wider than hook-shaped end section 30.

Figure 5A:
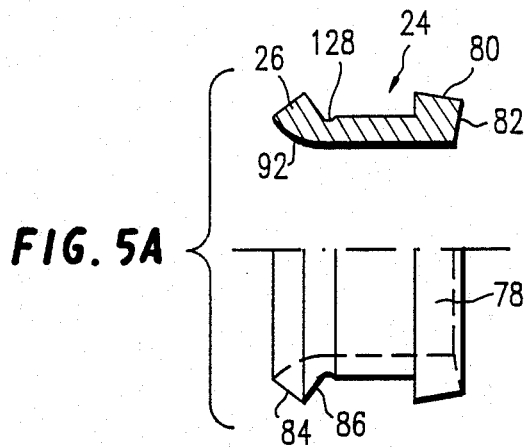
FIG. 5A in the upper part, a longitudinal section of a claw-type clamp and in the lower part, a side view of a sleeve body from which the claw-type clamp can be produced.
Figure 5B:
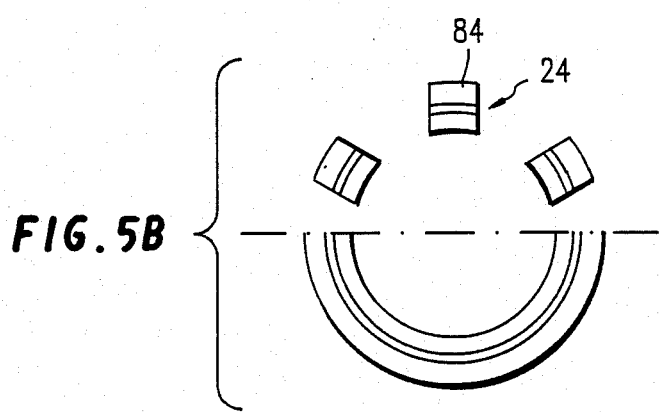
FIG. 5B in the upper part, front views of three claw-type clamps equidistant from one another and in the lower part, a front view of the sleeve-shaped body shown in FIG. 5A.

Details of the configuration of claw-type clamps 24 can be gathered from FIG. 5. A sleeve-shaped, dynamically balanced body 78, from which then suitable claw-type clamps 24 are cut out, serves as a blank for the production of such claw-type clamps, as can be seen in the upper part of FIG. 5B. Hook-shaped end section 30 exhibits two conical areas 80 and 82 to make possible the pivoting movement in guide recess 70 of clamping body 64. On its outside, claw section 26 is likewise formed by two conical areas 84 and 86, of which conical area 86 can be brought into flat engagement with a flank 88 (see FIG. 2B) of groovelike recess 36 in centering cylinder 12. The other conical area 84 of claw section 26 slants down toward tool system module 2, by which it is achieved that, especially in cooperation with a bevel 90 on the front of centering cylinder 12, a forced inward pivoting of claw-type clamps 24 occurs when the centering cylinder is inserted into centering mounting 18.

From the representation according to FIG. 1, it can be seen that the dimensions of claw-type clamps 24 are matched to the structure of groovelike recess 36 and of supporting groove 74, which provides as large an engagement area as possible between the functional areas.

From FIG. 1 it can further be seen that hook-shaped end section 30 of claw-type clamp 24 in each case, in cooperation with guide recess 70, is fixed stationary in the radial direction, by which a tilting of claw-type clamps 24 is effectively counteracted.

The slope of conical area 86 can have an influence on the size of the axial force to be generated. A further possibility to exert influence consists in the structure of thrust cone 34 in cooperation with appurtenant supporting area 92 on the side of claw-type clamps 24. In this way, a two-step transmission of the pull introduced in the axial direction of operating rod 20 is possible. In the embodiment shown, supporting area 92 is configured convex, so that a linear engagement between thrust cone 34 and supporting area 92 occurs. This configuration makes possible an automatic centering of thrust cone 34 and in doing so an introduction of the axial compressive force, free of transverse force, into both components to be coupled. To give thrust cone 34 the radial degree of freedom necessary for this, operating rod 20 is not supported fixedly in the area of the interface. It extends with radial play through an inner recess 94 (see FIG. 6A) of clamping body 64. Inner recess 94 exhibits a turned groove 96 for mounting an elastic ring, for example an O ring 98, which preferably is braced in a linear fashion on a cylinder-shaped coupling collar 100 of thrust cone 34. The outer diameter of coupling collar 100 is thus also smaller than the inner diameter of inner recess 94 in clamping body 64, so that a damped radial mobility of thrust cone 34 relative to spindle 4 remains. Further, the connection with operating rod 20, for which an inner thread 102 is provided, occurs by coupling collar 100. On the side facing away from inner thread 102, thrust cone 34 exhibits an end face 104 in which several recesses 106 are provided for engaging a suitable tool.

Coaxial to inner thread 102, a further inner thread 108 is provided for mounting a thread section 110 of a hollow pin 112, which can engage with fit into a bore 114 of basic tool holding fixture 2. On the outside of hollow pin 112, two annular slots 116 are provided for mounting gaskets 118, to prevent, with a supply of lubricant through a longitudinal recess 120 and an inner recess 122 of hollow pin 122, a penetration of lubricant or coolant into space 124 radially inside centering cylinder 12.

It can be seen from the above description that, under control by operating rod 20, a forcible pressing outward of claw sections 26 into groovelike recess 36 occurs, by which a repeatedly transmitted axial pressure can be generated in the area of radial ring areas 8 and 14. When operating rod 20 according to FIG. 1 is moved left, claw-type clamps 24 become free of forces, by which claw-type clamps 24 can pivot radially inward so far that in each case the radially outermost point of the claw section comes to lie inside the inner diameter $D_{12}$ of centering cylinder 12 (see FIG. 2A). Conical areas 84 and 86 on claw section 26 assure that when retracting centering cylinder 12, an inward pivoting of the claw-type clamps necessarily occurs. To additionally support this movement of the claw-type clamps, an elastic ring 126 is indicated in FIG. 1 that is supported in slots 128 (see FIG. 5A) and initially stresses claw-type clamps 24 radially inward.

The above description shows that the coupling device is in a position not only to apply great axial clamping forces distributed uniformly over the periphery, but further, by the spatial separation of the components an optimization of the functional areas necessary for this can occur for the transmission of the axial forces and the peripheral forces. In doing so the further advantage arises that the coupling device can also be used to index a tool system module in predetermined angular increments relative to the machine tool. For this purpose, reference is again made to FIG. 4, from which it can be seen that plane of symmetry $E_S$ of engaging dogs 42 encloses an angle of 30° with an axial plane $E_A$ through an edge vertex 130 of catch extension 52. This means that the basic tool holding fixture can be positioned in increments of 30° each relative to spindle 4.

Figure 8:
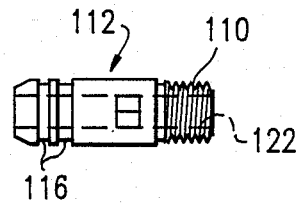
FIG. 8 a side view of the hollow pin according to FIG. 1.
Figure 9:
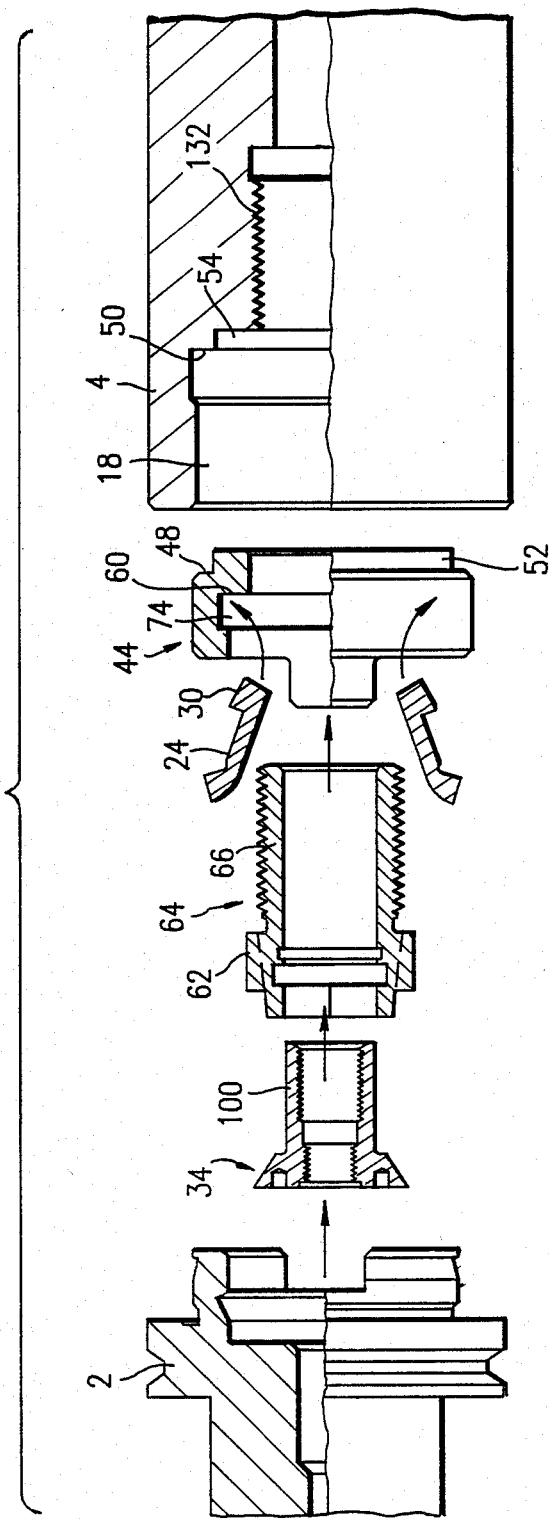
FIG. 9 a survey of the individual elements shown in FIG. 2 to 8 to clarify the assembly operation.

With reference to FIG. 9, it will be described below in detail how the assembly of the coupling device described above occurs. First, claw-type clamps 24 with their hook-shaped end sections 30 are mounted in supporting groove 74 of catch ring 44 and roughly positioned at an equal angular distance from one another. This occurs preferably in a vertical position. Next clamping body 64 with its thread section 66 is pushed radially inside claw-type clamps 24 through catch ring 44, and specifically so far that star-shaped holding section 62 butts against inner shoulder 60 of catch ring 44. In this state claw-type clamps 24 are already held in a non-slip way in catch ring 44. Now the unit of catch ring 44, claw-type clamps 24 and clamping body 64 is pushed into centering mounting 18 and, by turning thread section 66, is fastened in a corresponding inner thread 132 of spindle 4 in such a way that catch extension 52 engages in a non-slip way in indentation 54, and shoulder area 50 of spindle 4 and radial area 48 of catch ring 44 come to lie flat against each other. After insertion of elastic ring 98 in groove 96, the operating rod, not shown in FIG. 9, is screwed onto coupling extension 100 of thrust cone 34, after which hollow pin 112 shown in FIG. 8, for its part, is connected to thrust cone 34. When the operating rod is shifted to the left against the spring assembly mentioned above in the representation according to FIG. 1 and 9, thrust cone 34 is out of engagement with supporting areas 92 of claw-type clamps 24, after which basic tool holding fixture 2 can be set on spindle 4.

Figure 10:
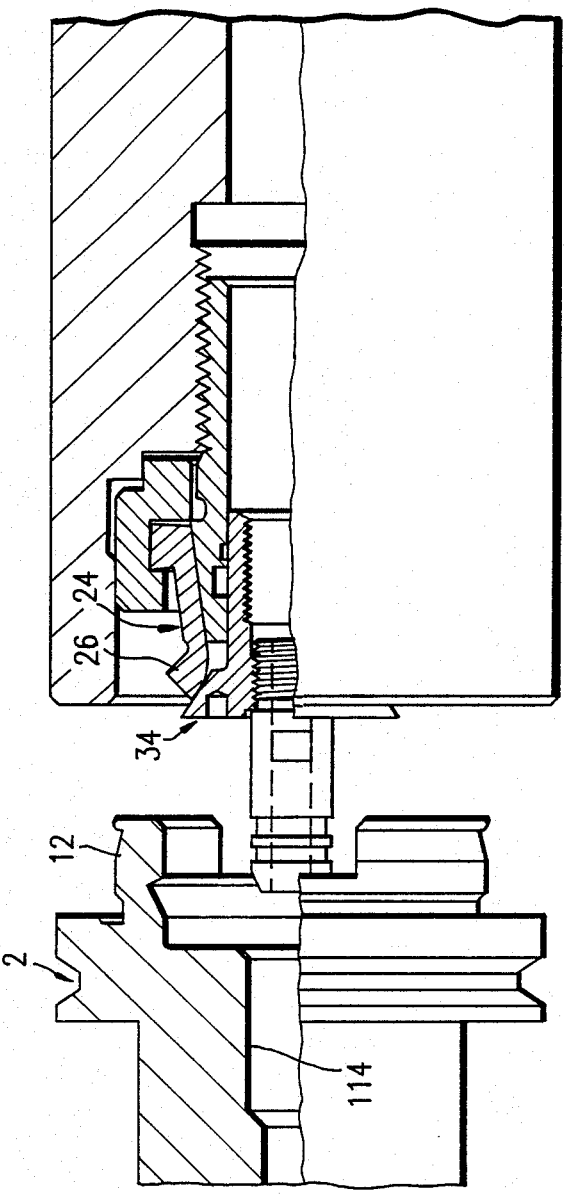
FIG. 10 a side view shown partially in section of the coupling device at the beginning of the coupling operation.
Figure 11:
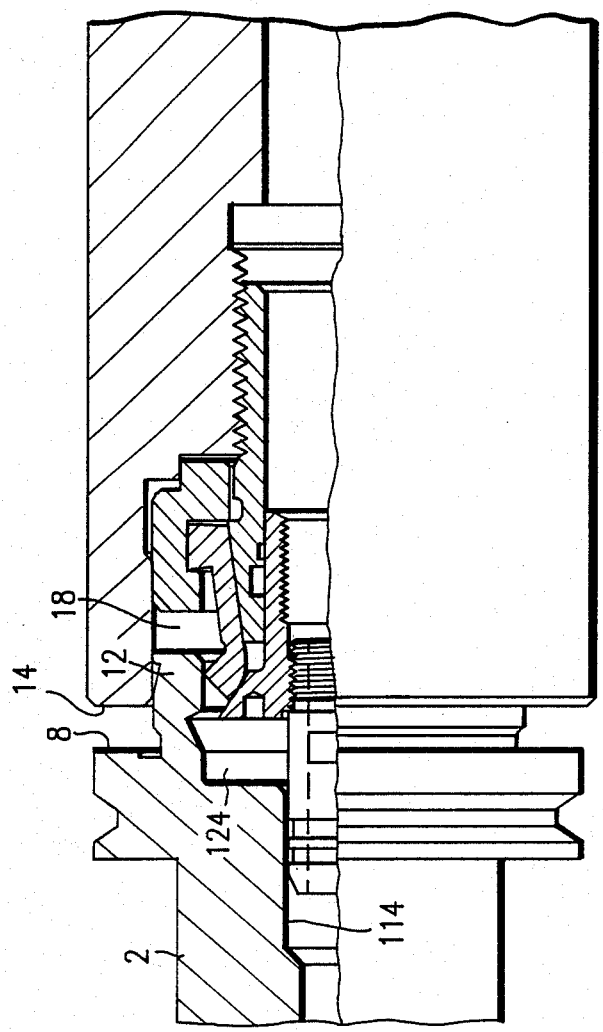
FIG. 11 a view of the coupling device similar to that of FIG. 10, and the centering cylinder is just being inserted into the machine tool mounting.

FIG. 10 represents the state of the coupling device at the beginning of the coupling operation. For simplicity's sake, the operating rod is omitted. Gaskets 118 on hollow pin 112 are not shown in the drawing either. Thrust cone 34 assumes, in this position, its left end position, so that claw-type clamps 24 can be pivoted radially inward so far that centering cylinder 12 of basic tool holding fixture 2 can slide over claw sections 26, as shown in FIG. 11. Simultaneously, when centering cylinder 12 slides into centering mounting 18, hollow pin 112 sinks into bore 114 of basic tool holding fixture 2, and a leakproof sealing of space 124 to bore 114 occurs by the gaskets—not shown. Under the centering effect of area 10, radial ring areas 8 and 14 are pushed against one another in plane parallel orientation. Finally, engaging dogs 42 engage in catch groove 38, after which ring areas 8 and 14 can be brought into engagement with each other.

Figure 12:
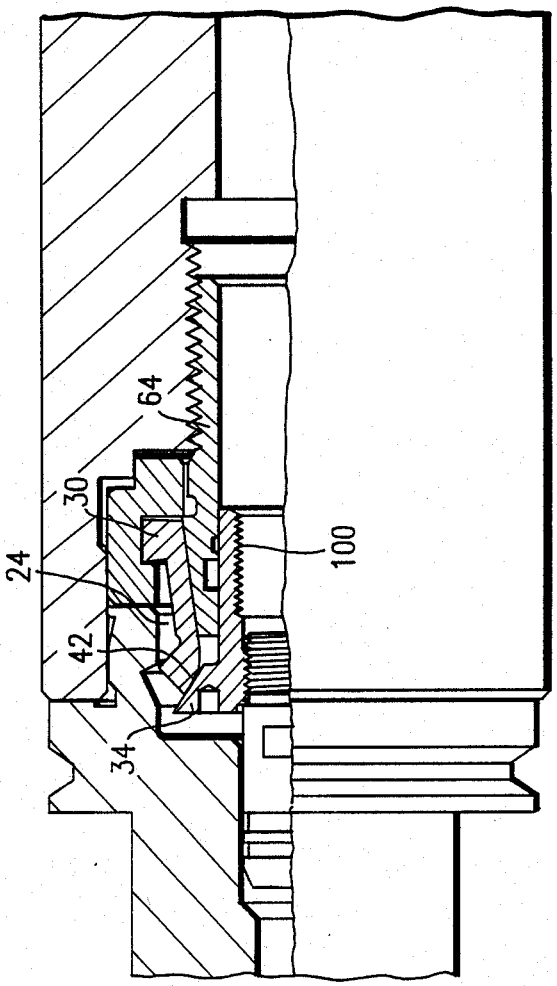
FIG. 12 a side view of the coupling device similar to FIG. 11 when the centering cylinder has been completely inserted.

This state is shown in the representation according to FIG. 12. By releasing the operating rod (not shown), the spring assembly (also not shown) becomes active and attempts to move the operating rod to the right together with thrust cone 34 according to FIG. 12. In doing so the thrust cone slides on supporting area 92 and presses claw sections 26 radially uniformly outward.

During the pivoting movement of claw-type clamps 24 into guide recesses 70 of clamping body 64 which takes place, hook-shaped end sections 30 are kept constantly in a fixed position in supporting groove 74 of catch ring 44. Preferably the adjustment of the geometric relationships occurs in such a way that in the clamped state a flat engagement of hook-shaped end section 30 and of claw section 26 against respective mating areas 76 or 36 occurs. Finally, the components of the coupling device in the coupled state assume the position according to FIG. 1, and an automatic centering effect of the thrust cone results from the radially elastic support of coupling collar 100 in clamping body 64.

Figure 13:
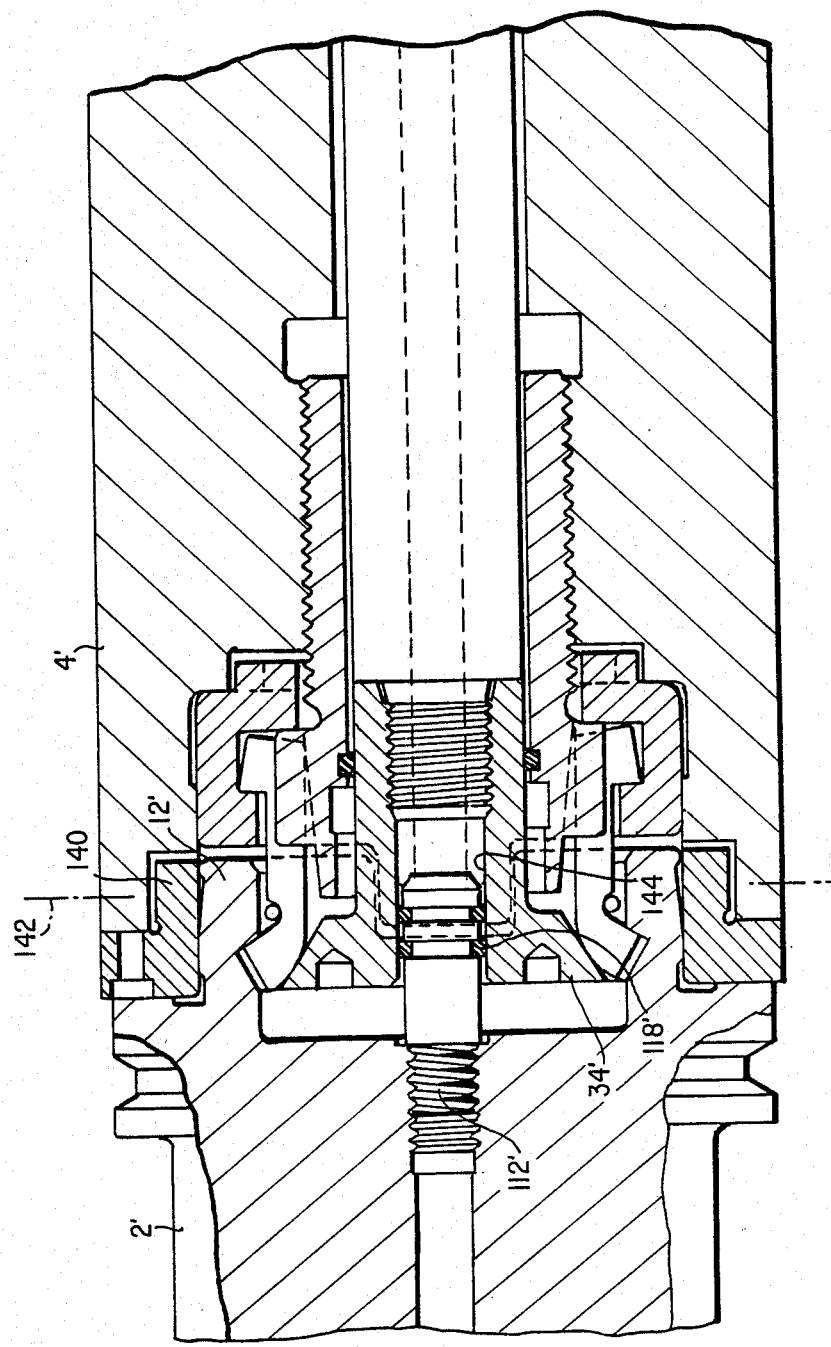
FIG. 13 a view corresponding to FIG. 1 of a modified embodiment of the coupling device.

FIG. 13 shows a further embodiment of the coupling device which, however, differs only in a few points from the embodiment described above. For this reason, this figure contains only those reference symbols that are necessary to explain this variant. Those components of the coupling device that are directly comparable to the components described above are provided with corresponding reference numbers supplemented with a "'".

The first change in the embodiment shown in FIG. 13 consists in the fact that on the spindle 4' side a centering ring 140 is provided that is preferably fastened adjustably in a radial direction on the front of spindle 4. This is indicated by dashed line 142. With this configuration, the concentricity of tool system module 2' can successfully be adjusted. Centering ring 140 consists preferably of hardened steel or of hard metal, to keep wear phenomena as limited as possible.

A further modification in comparison with the embodiment according to FIG. 1 to 12 is in the area of hollow pin 112'. Different from the embodiment described above, now hollow pin 112 is solidly connected to the tool system module in the configuration as basic tool holding fixture 2'. The projecting end is supported with fit in an inner bore 144 of thrust cone 34', and again gaskets 118' can be used. It can be seen that with this configuration the lifting path to release parts 2' and 4' can be limited to the length of centering cylinder 12'.

Different from the embodiment represented, it is also possible to work with claw-type clamps 24 that are radially offset inward, to be able, in this way, while retaining the bracing of hook-shaped end sections 30, to engage in a groovelike recess of a centering cylinder 12, which has a reduced diameter. In this case it is practical to work with an intermediate ring that is inserted into centering mounting 18 of spindle 4 and has an inner diameter that corresponds to the outer diameter of the reduced centering cylinder. With this variant it is achieved that, in the most limited space, tool system modules of greatly varying diameter stages can be coupled at one and the same interface.

In a further change of the embodiment shown, it is of course also possible to use the coupling system for coupling other machine or tool parts. Thus the system can also be used with stationary tools, such as for example cutting tools.

Six claw-type clamps 24 are provided in the embodiment described. Of course it is also possible to vary the number of claw-type clamps, but it should not go below the number "3," to distribute the axial force as uniformly as possible over the periphery.

It becomes clear from the description that the coupling device described is also suited to retrofit standard machine tools. For this purpose it is necessary only that a supplementary spindle flange be attached, which is then equipped with centering mounting 18.

A further embodiment of the coupling device will be described below that is additionally equipped with a sluice system. For simplicity's sake, identical reference symbols are used for those components that are comparable to parts of the embodiment described above.

Figure 14:
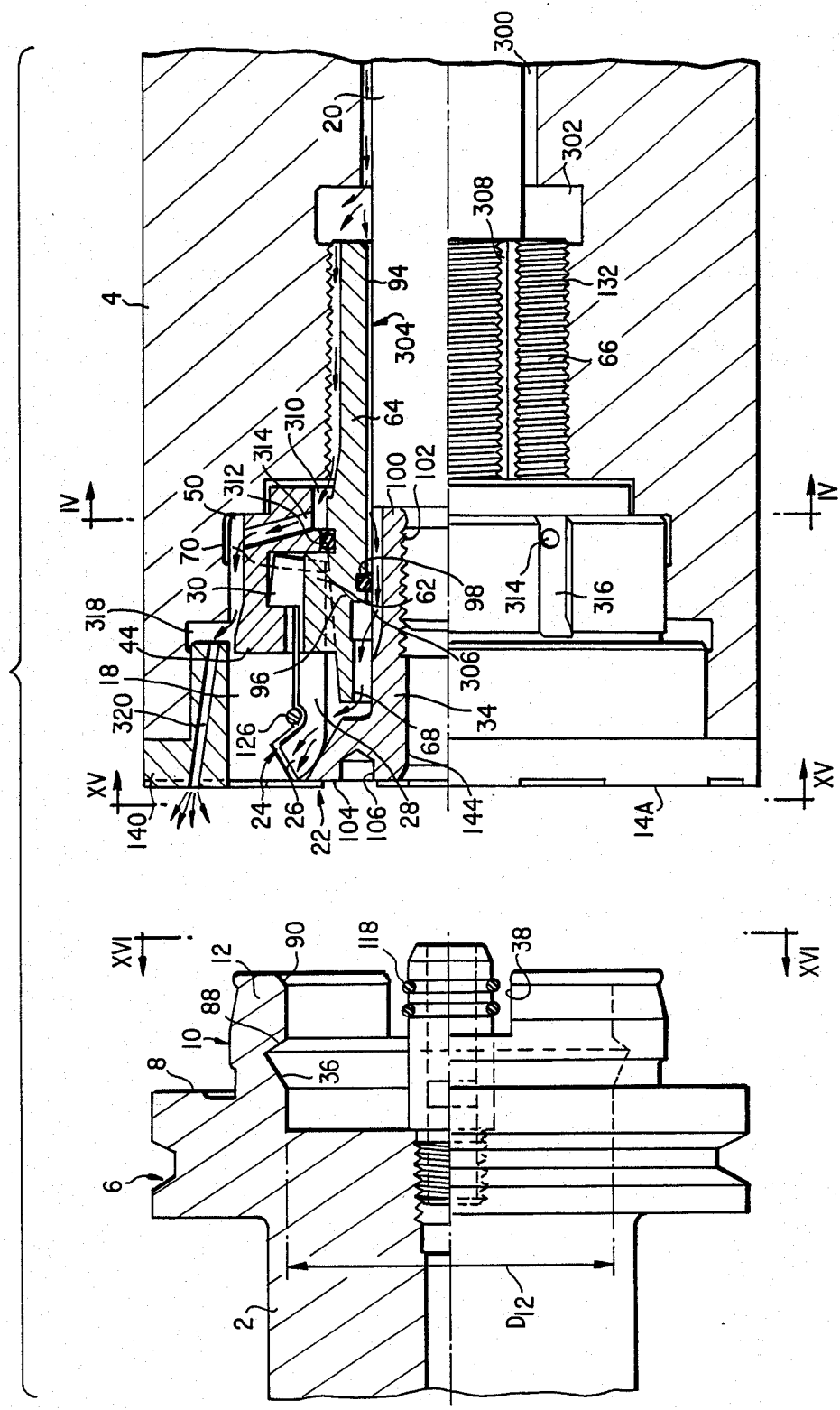
FIG. 14 an axial section of a further embodiment of the coupling device in the released state.

In FIG. 14, reference symbol 2 designates a tool system module, such as for example a basic tool holding fixture, and reference symbol 4, a machine tool spindle, such as for example the spindle of a grinding machine.

The release and engagement of the coupling occurs in the same way as in the embodiment described above.

Figure 16:
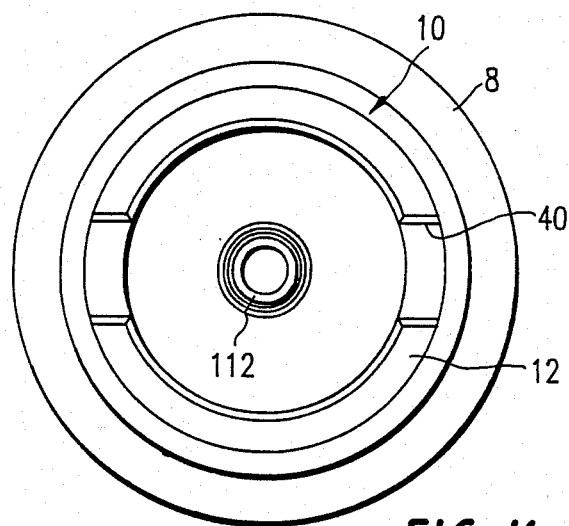
FIG. 16 a front view of the tool system module in the configuration of a basic tool holding fixture according to XVI in FIG. 14.
Figure 17:
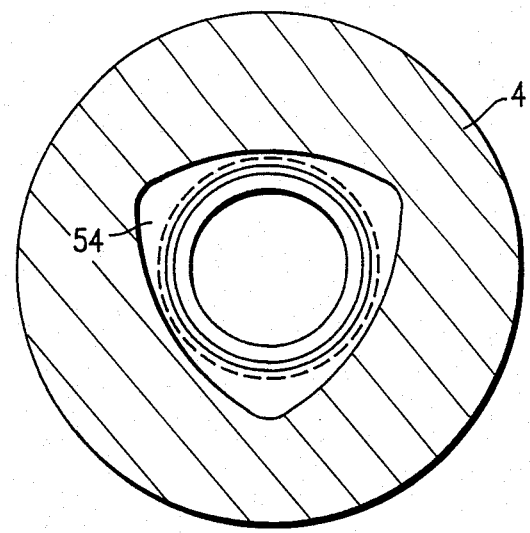
FIG. 17 a section according to XVII—XVII in FIG. 14.

To transmit the torque between spindle 4 and tool system module 2, a claw toothing is provided that will be described in detail below. A diametrically running catch groove 38 is incorporated, i.e., cut in, to centering cylinder 12 according to FIG. 16, so that two matching end faces 40 occur. Suitably shaped engaging dogs 42, constructed on a catch ring 44 in the embodiment represented, engage in this groovelike recess.

Figure 18C:
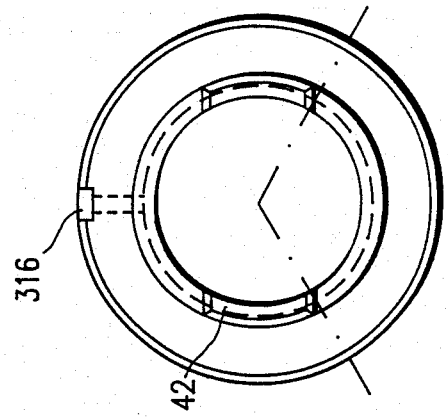
FIG. 18C a view of the catch ring according to "XVIIIC" in FIG. 18A.
Figure 18A:
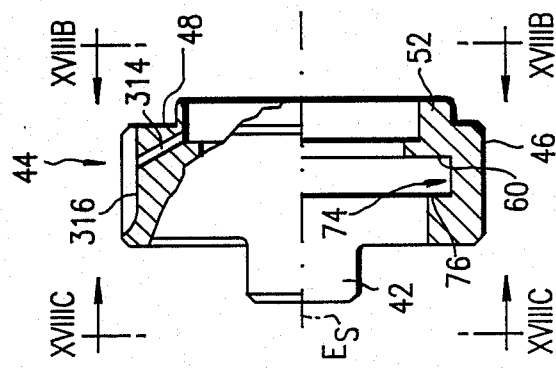
FIG. 18A a view shown partially in axial section of a catch ring.
Figure 18B:
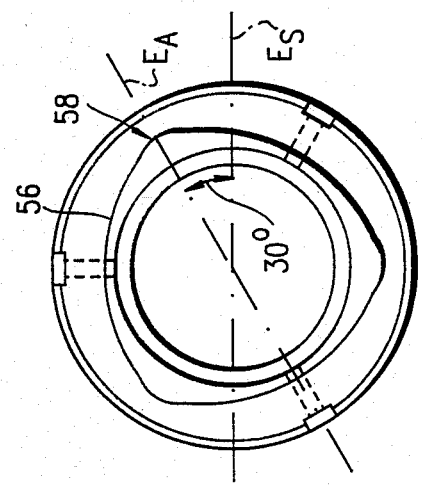
FIG. 18B a view of the catch ring according to "XVIII B" in FIG. 18A.

As to the configuration of the catch ring, the description of FIG. 4 can be referred to. FIG. 18 shows the common structural details.

From the representation according to FIG. 14 it can be seen, not in detail, that claw-type clamps 24 are guided in clamping body 64. For this purpose, between holding sections 62, a number of guide recesses corresponding to the number of claw-type clamps are provided in which, with clearance fit, claw-type clamps 24 are guided to be radially mobile. Further, a groove base 70 of the guide recesses slants down toward tool system module 2, so that the claw-type clamps can carry-out a limited pivoting movement in the radial direction inside the guide recesses. The groove base is indicated by the dashed line in FIG. 14.

Details of the configuration of claw-type clamps 24 follow from the description of FIG. 5A and 5B.

A hollow pin 112 is connected solidly to tool system module 2. The projecting end is supported with fit in an inner bore 144 of thrust cone 34, and gaskets 118 are provided on the side of hollow pin 112. It can be seen that with this configuration, the lifting path to release parts 2 and 4 can be limited to the length of centering cylinder 12.

From the description above it can be seen that, in agreement with the embodiment described above, with control by operating rod 20 a forcible pressing outward of claw sections 26 into groovelike recess 36 occurs, by which a repeatedly transmitted axial engagement pressure can be generated in the area of radial ring areas 8 and 14.

The assembly of the further embodiment occurs corresponding to the coupling device described above.

Different from the embodiment just described, on the spindle 4 side, a centering ring 140 is provided that is preferably fastened on the front of spindle 4 to be adjusted in the radial direction. This configuration achieves adjustment of the concentricity of tool system module 2. Centering ring 140 consists preferably of hardened steel or of hard metal, to keep wear phenomena as limited as possible.

To achieve a cleansing effect of the functional areas of the coupling parts that can be brought into engagement with each other, a compressed air sluice system to be described in more detail below is provided. Here, compressed air from a source not shown in more detail is fed to a ring channel 300 between connecting rod 20 and spindle 4. Ring channel 300 empties into a compressed air supply space 302, as represented by the arrows in FIG. 14. From common compressed air supply space 302, a compressed air rinsing flow is generated in two branches. The one compressed air branch flow reaches, through an intermediate space 304 between connecting rod 20 and guide body 64, several longitudinal recesses 306, preferably distributed uniformly over the periphery, on the outside of coupling collar 100 of thrust cone 34. From there, the flow reaches the front side of guide body 64 and escapes outward between guide body 64 and the back side of thrust cone 34 in a radial direction, by which claw sections 26 can be cleaned with compressed air.

Figure 15:
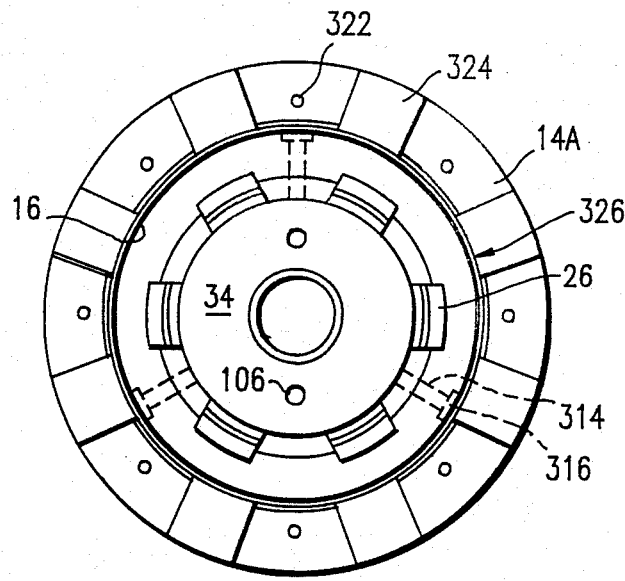
FIG. 15 a front view of the end section of a machine tool spindle facing the basic tool holding fixture according to II in FIG. 14.

The other compressed branch flow reaches, starting from compressed air supply space 302, preferably several axial slits 308 in the area of the thread of guide body 64. By axial slits 308, an annulus 310 is supplied that is sealed to claw-type clamps 24 by gasket 312 between guide body 64 and catch ring 44. Separate branch channels 314 run from annulus 310, preferably distributed uniformly over the periphery, and each empties into a longitudinal groove 316 on the outside of catch ring 44. The compressed air flow again branches on the front end of longitudinal groove 316. By an annulus 318, compressed air reaches, by a multiplicity of compressed air sluices 320 preferably distributed uniformly over the periphery, radial ring areas segments 14A (FIG. 15), by which the bracing of tool system module 2 on spindle 4 occurs. In doing so, compressed air sluices 320 are formed so that opening 322 exits essentially centered from radial ring area segments 14A. It can be seen from the representation according to FIG. 14 that radial ring area segments 14A are formed by incorporating diametrically running grooves 324 in the front of the spindle. In this way elutriation chambers arise that counteract a fouling of functional areas 14A.

A further cleansing compressed air stream goes from annulus 318 to inner cylinder area 16, as represented by the arrows in FIG. 14. This partial stream is generated by coordinating the inner diameter of centering ring 140 with the outer diameter of catch ring 44 so that an annular gap 326 arises.

It becomes clear from the description that when parts 2 and 4 are put together, the compressed air exiting compressed air sluices 320 is accelerated to an increasingly great extent as it approaches parts 2 and 4, by which the cleansing effect of end face segments 14A and ring area 8 is intensified. When parts 2 and 4 are completely put together, openings 322 are closed by end face 8 so that a further escape of compressed air is prevented and thus energy is saved. After completion of the coupling operation the compressed air supply is shut off.

Different from the embodiment represented, it is also possible to work with claw-type clamps 24 that are offset radially inward, to be able to, in this way, while retaining the bracing of hook-shaped end sections 30, engage in a groovelike recess of a centering cylinder 12 which has a reduced diameter. In this case it is practical to work with an intermediate ring that is inserted into centering mounting 18 of spindle 4 and has an inner diameter that corresponds to the outer diameter of the reduced centering cylinder. With this variant it can be achieved that tool system modules of greatly varying diameter steps can be coupled to the machine at one and the same interface in the smallest structural space.

In a further change of the embodiment shown, it is of course also possible to use the coupling system for coupling other machine or tool parts. Thus the system can also be used for vertical tools, such as cutting tools.

In the embodiment described, six claw-type clamps 24 are provided. Of course it is also possible to vary the number of claw-type clamps, but it should not go below the number "3" to distribute the axial force as uniformly as possible over the periphery.

It becomes clear from the description that the coupling device described is also suited to retrofit standard machine tools. For this purpose, it is necessary only that a supplementary spindle flange be attached, which is then equipped with centering mounting 18.

The invention was described based on an interface between a tool system module and a machine tool. But in the same advantageous way, the invention can also be used for an interface between a workpiece, a workpiece support, or a tool support and a handling device provided for it, such as for example a workpiece or tool changing or transport system, and the advantages can be exploited especially effectively in the handling of heavy systems.

The invention thus provides a coupling device between a workpiece support part or tool support part, such as for example a tool system module, for example in the form of a basic tool holding fixture, and a handling device, such as a machine tool, especially a spindle. For rapidly establishing and releasing the connection between these components while making high axial forces available, a clamping device with an operating rod is provided by which a key mechanism is controlled, with which clamping elements provided in the one part to be coupled can be pressed essentially radially outward into a suitably shaped recess on the other part to be coupled. The clamping elements are formed from at least three clamplike claw-type clamps placed at a uniform angular distance to each other, placed essentially parallel to a centering extension of the basic tool holding fixture and able to be pivoted, while being braced in a centering mounting of the spindle with a claw section lying radially inside the centering extension in the coupled state, into a groovelike recess of the centering extension. This coupling device is notable for a high flexibility with regard to application possibilities for producing them economically.

I claim:

1. A coupling device between a workpiece support part or tool support part, such as, for example, a tool system module, for example in the form of a basic tool holding fixture, and a handling device, such as a for example, a machine tool, comprising:
a mounting provided on the clamping device for the generation of an engagement pressure between end faces of the parts to be coupled, the clamping device having an operating rod, a key mechanism being actuated by said operating rod with which clamping elements provided in the one of the parts to be coupled can be pressed essentially radially outward into a suitably configured recess on the other part to be coupled, characterized in that the clamping elements are constructed of at least three clamplike claw-type clamps (24) which are placed peripherally equidistant from one another, essentially parallel to extension (12; 12') of tool system module (2; 2'), pivotable mounting means for pivotably mounting said at least three clamplike clamps into a groovelike recess (36) of extension (12; 12'), a recess (18) supporting said at least three clamplike clamps, said pivotable mounting means including a claw secton (26) which is in a coupled state radially inside extension (12; 12').

2. A coupling device according to claim 1, wherein the extension is formed by a centering cylinder (12; 12'), for which a centering mounting (18) of a spindle (4; 4') is provided on the machine tool side, and wherein in the front of centering cylinder (12) at least one recess (38) is provided for at least one engaging dog (42) provided on mounting (18).

3. A coupling device according to claim 1 or 2, wherein end faces (8, 14), by which the parts to be coupled can be pressed against each other, are formed by radial ring areas or radial ring area segments.

4. A coupling device according to claim 3, wherein key mechanism (22) exhibits a thrust cone (34) that lies radially inside claw section (26) and is connected to operating rod (20), and thrust cone (34) can be brought into engagement with engagement areas (92) of the claw-type clamps, and thrust cone (34) is attached on the end of operating rod (20) facing tool system module (2; 2'), and the stroke of operating rod (20) provided to release the coupling is matched to the depth to which claw sections (26) sink into groovelike recess (36) and to the wedge angle of thrust cone (34).

5. A coupling device according to claim 4, wherein operating rod (20), on its end area facing thrust cone (34), has a radial degree of freedom of movement.

6. A coupling device according to claim 2, wherein clamplike claw-type clamps (26), with their end sections (30) opposite claw section (26), engage in a supporting groove (74) of a catch ring (44) that is set into centering mounting (18) and that transmits the peripheral forces to tool system module (2; 2'), and supporting groove (74) is matched to the configuration of end sections (30) so that claw-type clamps (24), while maintaining engagement in the supporting groove with their claw sections (26), can be pivoted into and out of groovelike recess (36) of centering cylinder (12; 12'), and preferably catch ring (44) supports at least one engaging dog (42).

7. A coupling device according to claim 6, wherein centering recess (18) and radial shoulder (50) merges into an indentation (54) in which, to provide a connection resistant to twisting between machine tool spindle (4; 4') and catch ring (44), a suitably configured catch extension (52) of catch ring (44) engages in a non-slip way, and the catch extension (52) is configured prism-shaped with outer areas (56) being curved convex and having a K-profile.

8. A coupling device according to claim 6, wherein catch ring (44) supports two diametrically placed engaging dogs (42) whose plane of symmetry ($E_S$) encloses an angle of 30° with one of the three axial planes ($E_A$) through edges (130) of catch extension (52).

9. A coupling device according to one of claims 6 to 8, wherein claw-type clamps (24) are guided in a radial direction in axial grooves (70) of a guide body (64) that can be connected solidly to the part of the coupling device on the machine tool side, and the radial shoulder (50) presses catch ring (44) into centering mounting (18).

10. A coupling device according to claim 9, wherein guide body (64) can be screwed into part (4; 4') of the coupling on the machine tool side.

11. A coupling device according to claim 4, wherein thrust cone (34), on the side facing away from tool system module (2; 2'), has a cylinder-shaped coupling collar (100) by which it can be connected to operating rod (20).

12. A coupling device according to claim 9, wherein the cylindrical inner surface of guide body (64) has an annular slot (96) for holding a ring (98) that is elastic in the radial direction and by which thrust cone (34) can be stabilized radially.

13. A coupling device according to claim 4, wherein thrust cone (34), on the side facing away from operating rod (20), supports a hollow pin (112) that can be inserted as a seal into a coaxial recess (114) in tool system module (2).

14. A coupling device according to claim 4, wherein thrust cone (34') exhibits an axially centered bore (144) into which, during the coupling operation, a hollow pin (112') fastened coaxially in tool system module (2') can be inserted as a seal.

15. A coupling device according to one of claims 1, 2, 6, 7 or 8, wherein operating rod (20) has a longitudinal bore (120) passing through it.

16. A coupling device according to one of claims 1, 2, 6, 7 or 8, wherein groovelike recess (36) in extension (12; 12') is formed by an annular slot with a V cross section.

17. A coupling device according to one of claims 6, 7 or 8, wherein claw-type clamps (24), in the coupled state, are flat against a flank of groovelike recess (36) in extension (12; 12') and flat against a flank (76) of supporting groove (74).

18. A coupling device according to one of claims 2, 6, 7 or 8, wherein centering mounting (18), in the engagement area of centering cylinder (12'), is formed by a centering ring (140), which is fastened radially adjustably on spindle (4') and consists of a wear-resistant material.

19. A coupling device according to claim 1, wherein claw-type clamps (24) are produced by radial separation of a sleeve-shaped body (78) which forms, on its front ends, hooks (26,30) that project outward.

20. A coupling device according to claim 19, wherein claw-type clamps (24) are stressed inward in advance by an elastic ring (118, 118'), and the ring is mounted in a groove (128) adjacent to claw section (26).

21. A coupling device according to claim 19, wherein there is a sluice system (300 to 326) supplied with compressed air to cleanse the functional surfaces that can be brought into engagement on the components of the coupling device to be coupled.

22. A coupling device according to claim 21, wherein the end faces, by which the parts to be coupled can be pressed against each other, are formed, on the tool system module side, by a radial ring area (8) and, on the spindle (4) side, by radial ring area segments (14A), which preferably are separated from each other by grooves (324) that run diametrically and which each exhibit at least one opening (322) of compressed air sluices (320).

23. A coupling device according to one of claims 21 or 22, wherein guide body (64) presses catch ring (44) against radial shoulder (50) in centering mounting (18) and catch ring (44), in the area of catch extension (52), defines, with guide body (64), an annulus (314) that is sealed to claw-type clamps (24) and can be suppled with compressed air, from which three branch channels (314) distributed equidistant on the periphery run outward and empty in each case into a longitudinal groove (316) on the outside of catch ring (44) and are in flow connection with an annulus (318) to supply compressed air sluices (320).

24. A coupling device according to claim 23, wherein guide body (64) can be screwed into part (4) of the coupling on the machine tool side and in the area of the thread it has at least one slit (308) running essentially in the axial direction to supply annulus (314) with compressed air.

25. A coupling device according to claim 24, wherein thrust cone (34), on the side facing away from tool system module (2), has a cylinder-shaped coupling collar (100), by which it can be connected to operating rod (20), and wherein coupling collar (100), on its outer side, has longitudinal recesses (306) to define, between it and the cylindrical inner surface of guide body (64), a further sluice that is fed by an intermediate space (304) between connecting rod (20) and guide body (64) and is open toward claw sections (26) of claw-type clamps (24).

26. A coupling device according to claim 23, wherein the cylindrical inner surface of guide body (64) has an annular slot (96) for mounting a ring (98) that is elastic in a radial direction and by which thrust cone (34) can be radially stabilized.

27. A coupling device according to one of claims 21 or 22, wherein compressed air sluices (320) are constructed in centering ring (140).

28. A coupling device according to claim 27, wherein respective longitudinal grooves (316) in catch ring (44) run out radially inside annulus (318) and merge into an annular gap (326) that is open to cylindrical matching area (16) and preferably rotates.

29. A coupling device according to claim 28, wherein at least the one longitudinal slit (308) and intermediate space (304) between connecting rod (20) and guide body (64) go outward from a common compressed air supply space (302), which is supplied with compressed air by a ring channel (300) between connectin rod (20) and spindle (4).

* * * * *